(12) United States Patent
Nachenberg et al.

(10) Patent No.: US 7,873,999 B1
(45) Date of Patent: Jan. 18, 2011

(54) CUSTOMIZED ALERTING OF USERS TO PROBABLE DATA THEFT

(75) Inventors: Carey Nachenberg, Northridge, CA (US); David Cole, Santa Monica, CA (US)

(73) Assignee: Symantec Corporation, Cupertino, CA (US)

( * ) Notice: Subject to any disclaimer, the term of this patent is extended or adjusted under 35 U.S.C. 154(b) by 1011 days.

(21) Appl. No.: 11/394,717

(22) Filed: Mar. 31, 2006

(51) Int. Cl.
*G08B 23/00* (2006.01)

(52) U.S. Cl. .................. 726/22; 713/183; 713/193; 709/245; 709/246

(58) Field of Classification Search .................. 726/4, 726/8, 11, 22–24; 713/155, 183, 193; 709/201, 709/223, 245, 246
See application file for complete search history.

(56) References Cited

U.S. PATENT DOCUMENTS

| | | | |
|---|---|---|---|
| 6,088,803 A | | 7/2000 | Tso et al. |
| 6,314,409 B2 | | 11/2001 | Schneck |
| 6,928,553 B2 | | 8/2005 | Xiong et al. |
| 2002/0032677 A1 | * | 3/2002 | Morgenthaler et al. ......... 707/3 |
| 2002/0083343 A1 | | 6/2002 | Crosbie |
| 2002/0087882 A1 | | 7/2002 | Schneier et al. |
| 2002/0157020 A1 | | 10/2002 | Royer |
| 2003/0037251 A1 | * | 2/2003 | Frieder et al. ................ 713/200 |
| 2003/0051026 A1 | | 3/2003 | Carter |
| 2005/0050359 A1 | * | 3/2005 | Liang ......................... 713/201 |
| 2005/0081059 A1 | * | 4/2005 | Bandini et al. .............. 713/201 |
| 2007/0192865 A1 | * | 8/2007 | Mackin ........................ 726/24 |

FOREIGN PATENT DOCUMENTS

WO  WO 01/71499 A1  9/2001

OTHER PUBLICATIONS

Lee, Sin Yeung; Low, Wai Lup and Wong, Pei Yuen, "Learning Fingerprints for a Database Intrusion Detection System", Computer Security Laboratory, DSO National Labortories, Singapore, ESORICS Nov. 2002, LNCS 2502, pp. 264-279.

(Continued)

*Primary Examiner*—Taghi T Arani
*Assistant Examiner*—Gregory Lane
(74) *Attorney, Agent, or Firm*—Fenwick & West LLP

(57) ABSTRACT

Computer-implemented methods, systems, and computer-readable media for determining (200) an action time when an action is taken regarding an executable content; storing (205) the action time with an indication of the executable content; storing (215) an entry time and an indication of the entered data source when the data processing system enters one of the plurality of data sources; receiving (220) an indication that the executable content is infected with a malicious code; receiving (225) an indication of a data source targeted by the malicious code; scanning the data processing system for the malicious code at a scan time; storing (230) the scan time; determining (245) whether one of the plurality of data sources corresponds to the targeted data source; and when it is determined that one of the plurality of data sources corresponds to the targeted data source, determining (255) whether the entry time occurs after the action time and before the scan time; and when it is determined that the entry time occurs after the action time and before the scan time, sending (260) a warning regarding the potential threat.

18 Claims, 3 Drawing Sheets

OTHER PUBLICATIONS

Low, Wai Lup, et al., "DIDAFIT: Detecting Intrusions In Databases Through Fingerprinting Transactions," ICEIS 2002, Fourth International Conference On Enterprise Information Systems, vol. 1, Apr. 3-6, 2002, pp. 121-128, Ciudad Real, Spain.

Change log for Analysis Console for Intrusion Detection (Acid), indicating release date of Sep. 8, 2000 [online]. Andrew.cmu.edu [retrieved Apr. 18, 2003]. Retrieved from the Internet: <URL: http://www.andrew.cmu.edu/~rdanyliw/snort/CHANGELOG>, U.S.A.

AirCERT web page, last updated Sep. 18, 2000 [online]. Cert.org [retrieved Apr. 18, 2003]. Retrieved from the Internet: <URL: http://www.cert.org/kb/aircert/>, U.S.A.

Analysis Console for Intrusion Detection (ACID) web page [online]. Andrew.cmu.edu [retrieved Apr. 18, 2003]. Retrieved from the Internet: <URL: http://www.andrew.cmu.edu/~rdanyliw/snort/snortacid.html>, U.S.A.

Schneier, Bruce, Managed Security Monitoring: Network Security for the 21st Century, 2001 [online]. Counterpane.com [retrieved Apr. 18, 2003]. Retrieved from the Internet: <URL: http://www.counterpane.com/msm.pdf>, U.S.A.

Web page, announcing Nov. 11, 2000 release of Dshield [online]. Deja.com [retrieved Apr. 18, 2003]. Retrieved from the Internet: >URL: http://groups.google.com/groups?selm=8vm48v%245pd%241%40nnrp1.deja.com&oe=UTF-8&output=gplain>, U.S.A.

e=Security, Inc., Correlation Technology for Security Event Management, Oct. 7, 2002 [online]. eSecurityins.com [retrieved Apr. 18, 2003]: Retrieved from the Internet: <URL: http://www.esecurityinc.com/downloads/Correlation_WP.pdf>, Vienna, VA.

MyNetWatchman.com web pages indicating 9/00 beta release [online]. MyNetWatchman.com [retrieved Apr. 18, 2003]. Retrieved from the Internet: <URL: http://www.mynetwatchman.com/mynetwatchman/relnotes.htm>, Alpharetta, GA.

2000 Review of eSecurity product on Network Security web page [online]. SCMagazine.com [retrieved Apr. 18, 2003]. Retrieved from the Internet: <URL: http://www.scmagazine.com/scmagazine/2000_12/testc/network.htm#Open>.

"Caltarian Security Technology Platform", Riptech web pages [online]. Symantec.com [retrieved Apr. 18, 2003]. Retrieved from the Internet: <URL: http://enterprisesecurity.symantec.com/Content/displayPDF.cfm?SSSPDFID=35&EID=O>, U.S.A.

Slashdot.org web pages describing Dshield, dated Nov. 27, 2000 [online]. Slashdot.org [retrieved Apr. 18, 2003]. Retrieved from the Internet: <URL: http://slashdot.org/article.pl?sid=00/11/27/1957238&mode=thread>, U.S.A.

Chung, C., Gertz, M., and Levitt, K., "DEMIDS: A Misuse Detection System for Database Systems," Department of Computer Science, University of California at Davis, Oct. 1, 1999, pp. 1-18.

SCIP Product, Microdasys—"The need to control, inspect and manage encrypted webtraffic."[online]. Retrieved on Mar. 18, 2005. Retrieved from the Internet: <URL: http://www.microdasys.com/scipproduct+M54a708de802.html>. Author unknown, 2 pages, Czech Republic.

Microdasys, "S C I P Secured Content Inspection: Protecting the Enterprise from CryptoHacks," 2003 by Microdasys Inc., 2 pages, Czech Republic.

Marketing, "Digital Certificates—Best Practices—A Microdasys Whitepaper," bestpractice.doc, Revision 1.1 (Jul. 31, 2003), 6 pages, Czech Republic.

Network Computing Solutions—"Microdasys SCIP" [online]. Retrieved on Mar. 18, 2005. Retrieved from the Internet: <URL: http://www.ncs/cz/index.php?language=en&menuitem-4&subitem=13>, 2 pages, Czech Republic.

Network Computing Solutions—NSC Homepage—News [online]. Retrieved on Mar. 18, 2005. Retrieved from the Internet: <URL: http://www.nsc.cz/index.php?language=en&menuitem=0&subitem=4&subitem=13>, 3 pages, Czech Republic.

"SSL Stripper Installation Guide," [online]. Retrieved in Mar. 2005 from the Internet: <URL: http://www.sslstripper.com>, 2 pages, U.S.A.

SSL Stripper Home Page, "Security Solutions: SSL Stripper," [online]. Retrieved on Mar. 18, 2005. Retrieved from the Internet: <URL: http://www.vroyer.org/sslstripper/index.html>, 2 pages, Oct. 15, 2004, U.S.A.

SSL Stripper Sample Screenshots, "Security Solutions: Sample Screenshots," [online]. Retrieved on Mar. 18, 2005. Retrieved from the Internet: <URL: http://www.vroyer.org/sslstripper/screenshots.html>, 3 pages, Oct. 15, 2004, U.S.A.

Webwasher AG/Full feature set, "Full feature set," [online]. Retrieved on Mar. 18, 2005. Retrieved from the Internet: <URL: http://www.webwasher.com/enterprise/products/webwasher_products/ssl_scanner/full_feature_set..html?l...>, 2 pages.

Webwasher AG/Webwasher 1000 CSM Appliance, "Webwasher 1000 CSM Appliance," [online]. Retrieved on Mar. 18, 2005. Retrieved from the Internet: <URL: http://www.webwasher.com/enterprise/products/webwasher_products/csm_appliance/index...> 2 pages.

Webwasher AG/Webwasher URL Filter, "Webwasher URL Filter," [online]. Retrieved on Mar. 18, 2005. Retrieved from the Internet: <URL: http://www.webwasher.com/enterprise/products/webwasher_products/webwasher_url_filter..> 1 page.

Webwasher AG/Webwasher Anti Virus, "Webwasher Anti Virus," [online]. Retrieved on Mar. 18, 2005. Retrieved from the Internet: <URL: http://www.webwasher.com/enterprise/products/webwasher_products/anti_virus/index.html...>, 2 pages.

Webwasher AG/Webwasher Anti Spam, "Webwasher Anti Spam," [online]. Retrieved on Mar. 18, 2005. Retrieved from the Internet: <URL: http://www.webwasher.com/enterprise/products/webwasher_products/anti_spam/index.htm...>, 1 page.

Webwasher AG/Webwasher Content Protection, "Webwasher Content Protection," [online]. Retrieved on Mar. 18, 2005. Retrieved from the Internet: <URL: http://www.webwasher.com/enterprise/products/webwasher_products/content_protection/index.html>, 2 pages.

Webwasher AG/Webwasher SSL Scanner, "Webwasher SSL Scanner," [online]. Retrieved on Mar. 18, 2005. Retrieved from the Internet: <URL: http://www.webwasher.com/enterprise/products/webwasher_products/ssl_scanner/index.html>, 2 pages.

CyberGuard Corporation, "CyberGuard and Webwasher: The Value Proposition," A CyberGuard Corporation White Paper, May 2004, 6 pages.

* cited by examiner

CUSTOMIZED ALERTING OF USERS TO PROBABLE DATA THEFT

TECHNICAL FIELD

This invention pertains to the field of antivirus software, and in particular, to methods and systems for alerting a user when a given piece of malicious code has been active on a user's computer while the user accessed related, sensitive data sources.

BACKGROUND ART

Conventional antivirus programs search computers for malicious code, e.g., spyware, rootkits, Trojan Horses, viruses, or worms, and remove any that are found. Users frequently download profiles of new malicious code so that the antivirus program can check for the new malicious code as soon as it is discovered. Most antivirus programs include an auto-update feature that automatically downloads the profiles of new malicious code on a regular basis. One major drawback to these programs is shown in the following scenario: A user's computer becomes infected by a particular strain of malicious code that is not known or detectable by the current antivirus product. Unbeknownst to the user, the malicious code monitors the user's behavior, recording the user's passwords or other information as the user visits various data sources (such as a banking website). Subsequently, the antivirus software fingerprints are updated, enabling the antivirus software to detect the malicious code on the user's machine. However, the antivirus software cannot inform the user that this malicious code targeted the user during the period before the fingerprints were updated. The ability to provide this information (e.g., "You were infected last week with a piece of unknown malicious code which tracked your banking transactions. Please contact your bank to change your password.") will be extremely useful to customers, so they can be alerted to possible eavesdropping on their accounts.

DISCLOSURE OF INVENTION

In accordance with methods and systems consistent with the present invention, computer-implemented methods, apparatus, and computer-readable media are provided for alerting a user regarding a potential threat on a data processing system used to enter a plurality of data sources. An embodiment of the inventive method comprises the steps of determining (200) an action time when an action is taken regarding an executable content; storing (205) the action time with an indication of the executable content; storing (215) an entry time and an indication of the entered data source when the data processing system enters one of the plurality of data sources; receiving (220) an indication that the executable content is infected with a malicious code; receiving (225) an indication of a data source targeted by the malicious code; scanning the data processing system for the malicious code at a scan time; storing (230) the scan time; determining (245) whether one of the plurality of data sources corresponds to the targeted data source; and when it is determined that one of the plurality of data sources corresponds to the targeted data source, determining (255) whether the entry time occurs after the action time and before the scan time; and when it is determined that the entry time occurs after the action time and before the scan time, sending (260) a warning regarding the potential threat.

BRIEF DESCRIPTION OF THE DRAWINGS

These and other more detailed and specific objects and features of the present invention are more fully disclosed in the following specification, reference being had to the accompanying drawings, in which.

DETAILED DESCRIPTION OF THE PREFERRED EMBODIMENTS

Methods, apparatus, and articles of manufacture consistent with the present invention overcome the shortcomings of the prior art by providing users with personalized threat information when a user's computer is infected with malicious code, such as spyware, a rootkit, a Trojan Horse, a virus, or a worm. For example, if the user's machine is infected with a threat that targets a given bank, methods and systems consistent with the present invention may send the user a personalized alert suggesting that the user contact the bank to cancel the user's credit card account since the spyware appears to steal the credit card numbers of the bank's customers. The alert may also include contact information for the bank, such as the bank's telephone number. Personalizing the experience for the customer provides significantly more value than a traditional antivirus/security product.

Figure 1:
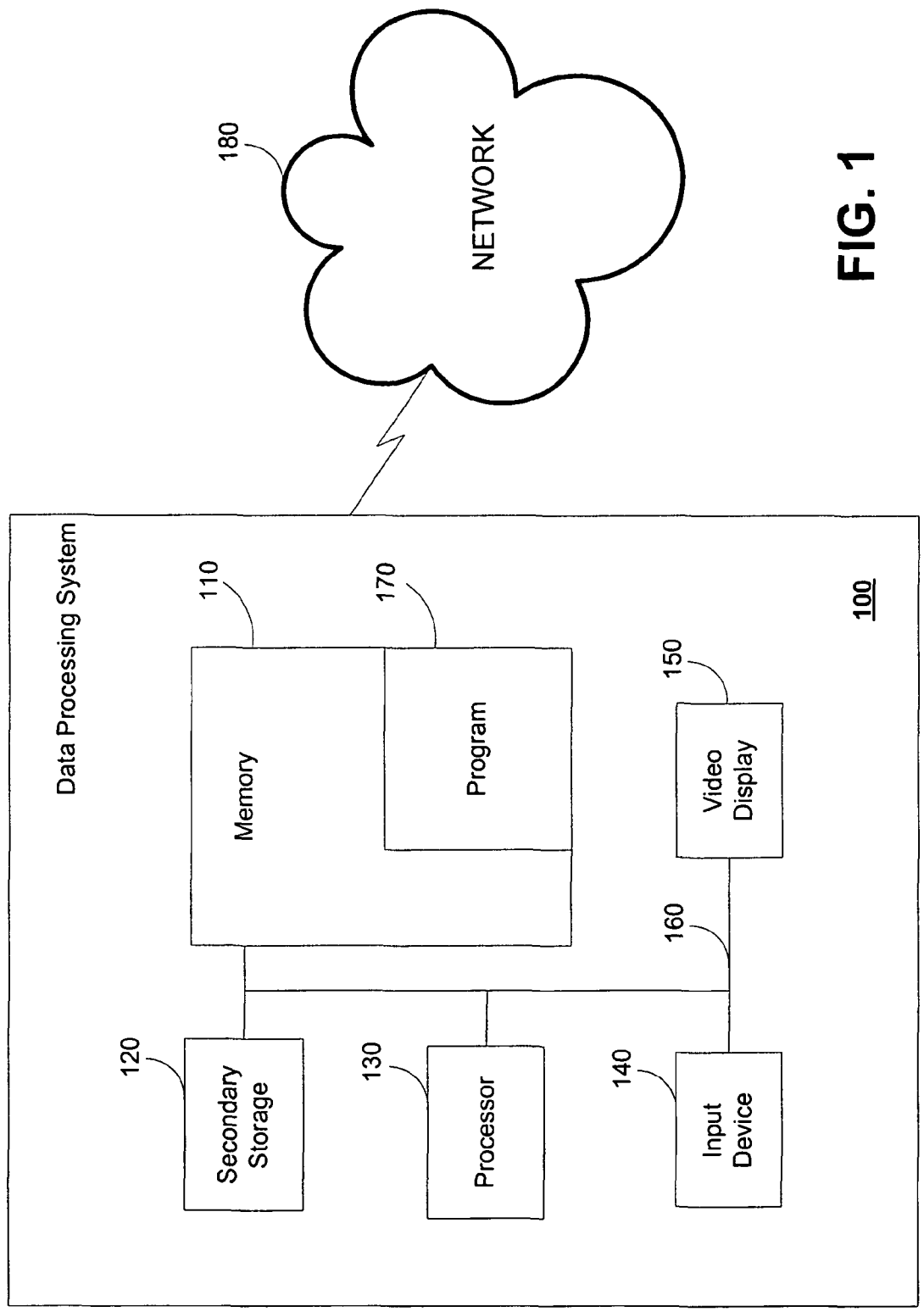
FIG. 1 depicts a data processing system suitable for implementing an embodiment of the present invention.

FIG. 1 depicts an exemplary data processing system 100 suitable for practicing methods and systems consistent with the present invention. Data processing system 100 is connected to a network 180, such as a Local Area Network, Wide Area Network, or the Internet.

Data processing system 100 contains a main memory 110, a secondary storage device 120, a processor 130, an input device 140, and a video display 150. These internal components exchange information with one another via a system bus 160. These components are standard in most computer systems suitable for use with practicing methods and configuring systems consistent with the present invention.

Memory 110 includes a program 170. One having skill in the art will appreciate that program 170 can reside in a memory on a system other than data processing system 100. Program 170 may comprise or may be included in one or more code sections containing instructions for performing their respective operations. While program 170 is described as being implemented as software, the present invention may be implemented as any combination of hardware, firmware, and/or software.

Although not shown in FIG. 1, like all data processing systems, data processing system 100 has an operating system that controls its operations, including the execution of program 170 by processor 130. Also, although aspects of one implementation consistent with the principles of the present invention are described herein with program 170 stored in main memory 110, one skilled in the art will appreciate that all or part of methods and systems consistent with the present invention may be stored on or read from other computer-readable media, such as secondary storage devices 120, e.g., hard disks, floppy disks, and CD-ROM; a carrier wave received from a network such as the Internet; or other forms of ROM or RAM, either currently known or later developed. Finally, although specific components of data processing system 100 have been described, one skilled in the art will appreciate that a data processing system suitable for use with methods and systems consistent with the present invention may contain additional or different components.

Figure 2A:
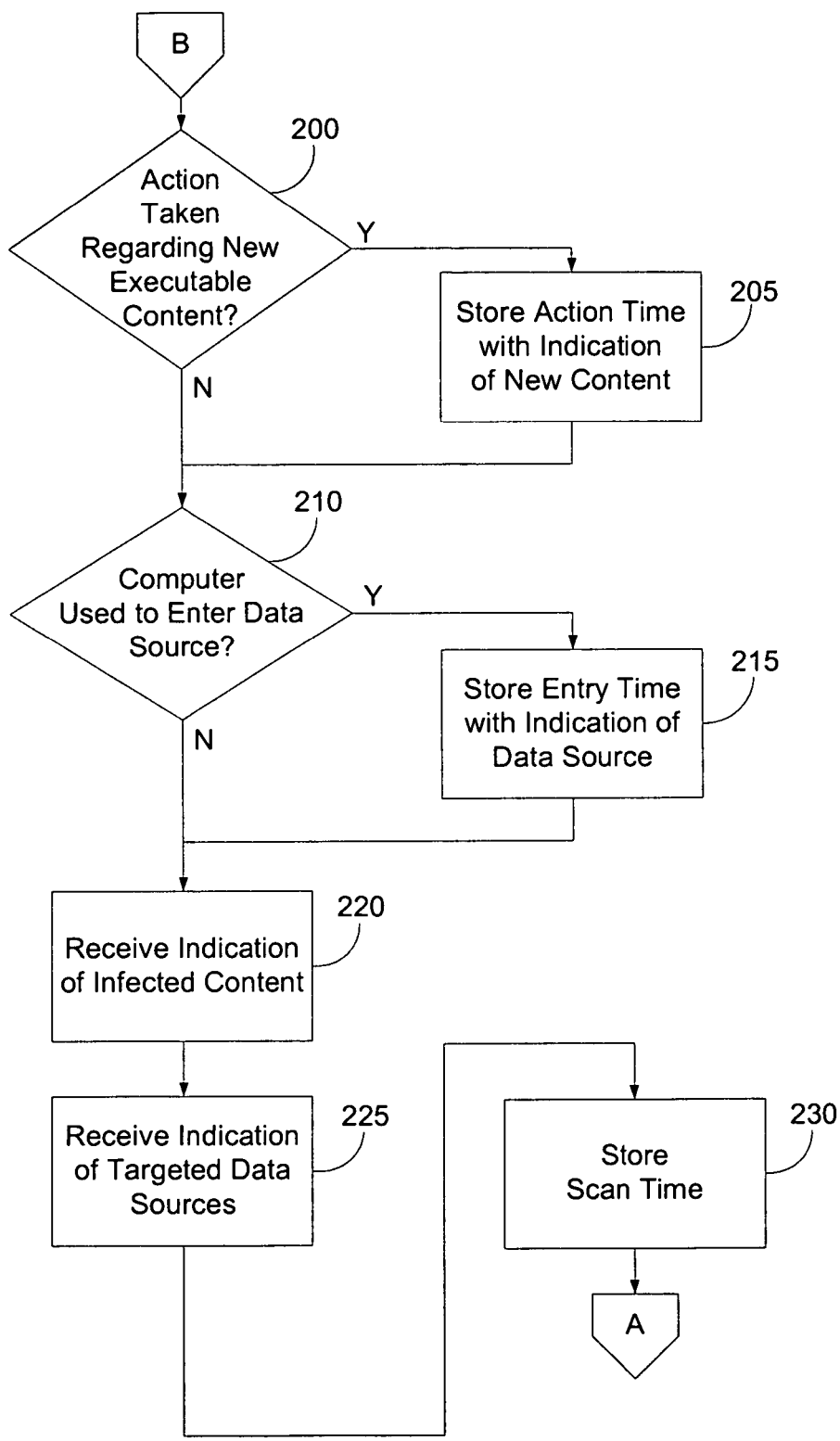
FIG. 2 depicts a flow diagram illustrating an embodiment of the present invention.
Figure 2B:
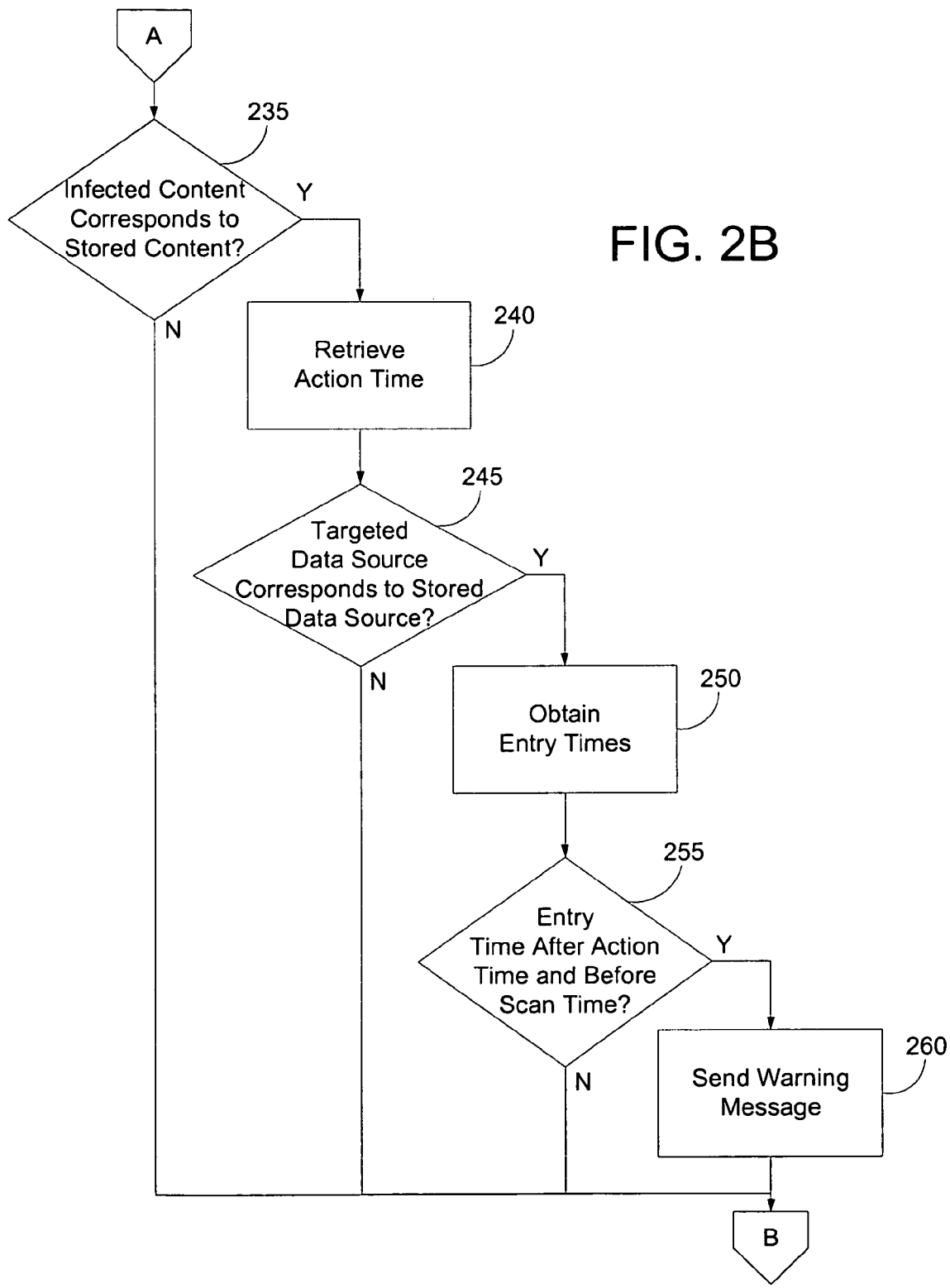

FIG. 2 depicts a flow chart illustrating the steps performed by data processing system 100 in one embodiment to alert a user of a potential threat. Using an operating system hooking approach, data processing system 100 tracks the arrival of all new executable content on the system in real time. The executable content may include an executable file or a dynamically-created new process or thread for which an executable file is not present, such as a script that is directly loaded onto a web browser, a buffer overflow on the browser, or some other memory-based content. If data processing system 100 determines that an action is taken regarding a new executable content (step 200), data processing system 100 stores the time that the action is taken along with an indication of the new executable content (step 205). The data processing system 100 preferably stores this information in a protected local or remote memory. In a preferred embodiment, the action comprises the first execution of the new content. One having skill in the art will appreciate that the data processing system 100 also may track other actions, such as the creation of the content or modification of the content. The indication of the new executable content may comprise the name of the content or the location of the content.

After storing the information at step 205 or if data processing system 100 determines that an action is not taken regarding a new executable content at step 200, data processing system 100 uses a network hooking approach to track all data sources visited by the user and the time of each visit. The data source may include a website, or a local or remote data source. Examples of data sources include programs that maintain passwords on a computer system, databases, financial programs like Quicken or Microsoft Money, etc. If data processing system 100 determines that the user uses the system to enter a data source (step 210), the system 100 stores the entry time and an indication of the data source (step 215). The indication of the data source may comprise the Uniform Resource Locator (URL) of a website, a hash of part or all of the URL, the domain name, or the name and/or location of a database.

The data processing system 100 then receives an indication of an infected content (step 220) and receives an indication of the data sources targeted by this threat (step 225). This step occurs when a user downloads the latest definitions of the malicious code. The malicious code definition metadata includes the information regarding the targeted data sources. When the user uses the antivirus software to scan his/her computer, the data processing system 100 stores the scan time (step 230). The data processing system then determines whether the infected content corresponds to any of the new content stored at step 205 (step 235). If the data processing system 100 determines that the infected content corresponds to one of the new content, data processing system retrieves the action times for that new content (step 240). Thus, if content is found to be infected, the data processing system 100 determines when the content was first executed, created, or modified on the system. Data processing system 100 then determines whether the targeted data sources correspond to any of the stored data sources (step 245). If the data processing system determines that the targeted data source corresponds to one of the stored data sources, data processing system 100 obtains the entry times (step 250). Data processing system 100 then determines whether any of the entry times are after the action time and before the scan time (step 255). If any of the entry times are after the action time and before the scan time, data processing system 100 sends a warning message to the user (step 260). The warning may include the name of the targeted data source, contact information for the targeted data source, and the type of information targeted by the malicious code. Alternatively, the data processing system 100 may initiate an action, such as uploading a copy of the malicious code to the provider of the antivirus software, automatically creating an email message containing information targeted by the malicious code so that the user can easily send the notification to the contact for the targeted data source, or initiating a contact to the user's credit bureau to handle the infection.

Thus, data processing system 100 scans the list of all data sources that the user visits after the malicious code is first executed, created, or modified on the system, and if the user visited any data sources that are targeted by the threat, then data processing system 100 alerts the user that the user's activities may have been observed by the malicious code so that the user may contact the proper authorities.

Using methods and systems consistent with the present invention, if a user's computer were to become infected by spyware that targets the customers of a given bank on January 1st, data processing system 100 would store January 1st as the time the content was first executed, created, or modified on the system. As of January 1st, the antivirus software cannot yet detect the infection. If the user surfs to the bank between January 1st and January 14th, and downloads the latest malicious code definitions that include this threat on January 15th, upon scanning the user's computer, methods and systems consistent with the present invention will alert the user that the user should contact the bank because the spyware threat targets the bank's customers and that the user has connected to the bank subsequent to infection by the spyware threat.

Similarly, using methods and systems consistent with the present invention, if on January 1st a user's computer were to become infected by spyware that targets a program that maintains all of the user's passwords on the user's computer, data processing system 100 would store January 1st as the time the executable content was first executed, created, or modified on the system. On January 2nd, the user runs the program. If the user downloads the latest malicious code definitions that include the relevant threat on January 15th, upon scanning the user's computer, methods and systems consistent with the present invention will alert the user that the user should take some action because the spyware targets the program, and the user ran the program after becoming infected by the spyware.

Using this approach, methods and systems consistent with the present invention determine whether or not a user was impacted by a particular threat, and notify the user definitively whether or not the user needs to take further actions (e.g., contacting the user's bank) beyond simply removing the threat from the user's computer.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the present invention.

What is claimed is:

1. A method for alerting a user regarding a potential threat on a data processing system, the method comprising the steps of:

using the data processing system to execute steps comprising:

determining an action time when an action is taken regarding executable content located at the data processing system, the action time being stored in a protected local storage medium, wherein the action comprises at least one of a first execution of the executable content, creation of the executable content, and modification of the executable content;

tracking data sources visited by the user and entry times of data sources entered by the user using the data processing system, wherein at least one of the entered data sources comprises a website visited by the user;

receiving an indication that the executable content is infected with a malicious code and an indication of a data source targeted by the malicious code, wherein the targeted data source comprises a website;

determining whether an entered data source corresponds to the targeted data source; and when it is determined that an entered data source corresponds to the targeted data source, determining whether an entry time for the entered data source occurs after the action time, and when it is determined that the entry time for the entered data source occurs after the action time, sending a warning regarding the targeted data source to the user.

2. The method of claim 1, wherein the executable content comprises one of an executable file and a memory-based content.

3. The method of claim 1, wherein the malicious code comprises at least one of spyware, a rootkit, a Trojan Horse, a virus, and a worm.

4. The method of claim 1, wherein the indication of the data source comprises at least one of a uniform resource locator (URL) identifying the website targeted by the malicious code, a hash of the URL, and a domain name identifying a domain of the website targeted by the malicious code.

5. The method of claim 1, wherein the indication of the data source comprises one of a name of the data source and a location of the data source.

6. The method of claim 1, wherein the warning comprises at least one of a name of the targeted data source, contact information for the targeted data source, and a type of information targeted by the malicious code.

7. A non-transitory computer-readable medium storing a computer executable program for alerting a user regarding a potential threat on a data processing system, the computer executable program comprising program instructions for:

determining an action time when an action is taken regarding executable content located at the data processing system, the action time being stored in a protected local storage medium, wherein the action comprises at least one of a first execution of the executable content, creation of the executable content, and modification of the executable content;

tracking data sources visited by the user and entry times of data sources entered by the user using the data processing system, wherein at least one of the entered data sources comprises a website visited by the user;

receiving an indication that the executable content is infected with a malicious code and an indication of a data source targeted by the malicious code, wherein the targeted data source comprises a website;

determining whether an entered data source corresponds to the targeted data source; and when it is determined that an entered data source corresponds to the targeted data source, determining whether an entry time for the entered data source occurs after the action time, and when it is determined that the entry time for the entered data source occurs after the action time, sending a warning regarding the targeted data source to the user.

8. The computer-readable medium of claim 7, wherein the executable content comprises one of an executable file and a memory-based content.

9. The computer-readable medium of claim 7, wherein the malicious code comprises at least one of spyware, a rootkit, a Trojan Horse, a virus, and a worm.

10. The computer-readable medium of claim 7, wherein the indication of the data source comprises at least one of a uniform resource locator (URL) identifying the website targeted by the malicious code, a hash of the URL, and a domain name identifying a domain of the website targeted by the malicious code.

11. The computer-readable medium of claim 7, wherein the indication of the data source comprises one of a name of the data source and a location of the data source.

12. The computer-readable medium of claim 7, wherein the warning comprises at least one of a name of the targeted data source, contact information for the targeted data source, and a type of information targeted by the malicious code.

13. A data processing system for alerting a user regarding a potential threat, comprising:

a memory device storing a computer executable program for:

determining an action time when an action is taken regarding executable content located at the data processing system, the action time being stored in a protected local storage medium, wherein the action comprises at least one of a first execution of the executable content, creation of the executable content, and modification of the executable content;

tracking data sources visited by the user and entry times of data sources entered by the user using the data processing system, wherein at least one of the entered data sources comprises a website visited by the user;

receiving an indication that the executable content is infected with a malicious code and receiving an indication of a data source targeted by the malicious code, wherein the targeted data source comprises a website;

determining whether an entered data source corresponds to the targeted data source; and when it is determined that an entered data source corresponds to the targeted data source, determining whether an entry time for the entered data source occurs after the action time, and when it is determined that the entry time for the entered data source occurs after the action time, sending a warning regarding the targeted data source to the user; and a processor, coupled to the memory device, configured to execute the computer program.

14. The data processing system of claim 13, wherein the executable content comprises one of an executable file and a memory-based content.

15. The data processing system of claim 13, wherein the malicious code comprises at least one of spyware, a rootkit, a Trojan Horse, a virus, and a worm.

16. The data processing system of claim 13, wherein the indication of the data source comprises at least one of a uniform resource locator (URL) identifying the website targeted by the malicious code, a hash of the URL, and a domain name identifying a domain of the website targeted by the malicious code.

17. The data processing system of claim 13, wherein the indication of the data source comprises one of a name of the data source and a location of the data source.

18. The data processing system of claim 13, wherein the warning comprises at least one of a name of the targeted data source, contact information for the targeted data source, and a type of information targeted by the malicious code.

* * * * *